H. TRILLICH.
PROCESS OF EXTRACTING CAFFEIN.
APPLICATION FILED APR. 15, 1909.
950,357.
Patented Feb. 22, 1910.
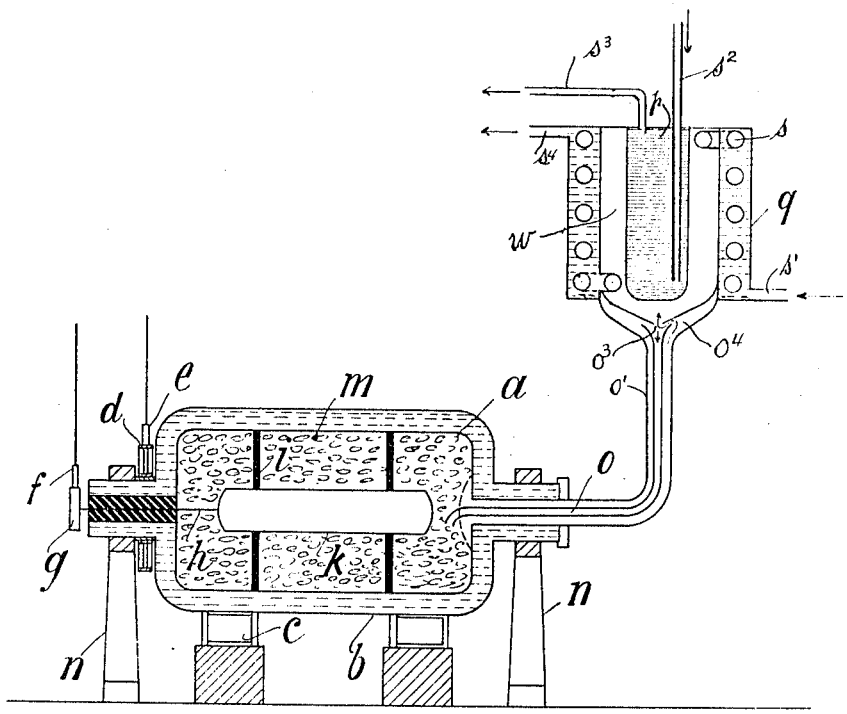
Witnesses
Inventor
Heinrich Trillich
by Nicholas L. Bogan
Attorney.

UNITED STATES PATENT OFFICE.

HEINRICH TRILLICH, OF MUNICH, GERMANY.

PROCESS OF EXTRACTING CAFFEIN.

950,357.  Specification of Letters Patent. Patented Feb. 22, 1910.

Application filed April 15, 1909. Serial No. 490,161.

*To all whom it may concern:*

Be it known that I, HEINRICH TRILLICH, a subject of the King of Bavaria, residing at 21 Prinzregentenplatz, Munich, Bavaria, Germany, have invented certain new and useful Improvements in Processes of Extracting Caffein from Coffee or from Similar Materials which Contain Caffein, of which the following is a specification.

This invention relates to a process of extracting caffein from unground raw coffee beans and also from other materials which contain caffein, such process being very effective and furnishes within a short time, a product which is sufficiently freed from caffein without the loss of any aromatic or other useful ingredients of the coffee.

As is well known, the combinations between caffein and tannic acid or the like prevent the caffein from being totally extracted from the coffee and similar substances containing caffein and it has therefore been recognized as necessary to dissociate such combinations before a sufficient extraction of the caffein can be obtained. Therefore the process in accordance with this invention aims to dissociate and extract the caffein from the coffee without diminishing the aroma or changing the taste of the coffee and further without injuring the structure of the bean, and to obtain the foregoing objects the combinations between caffein and tannic acid are dissociated by means of electrolysis before the beginning of the extraction, it, however, has also been recognized as useful to form the dissociation by means of electrolysis during the extraction with hot dissolvents, such as acetic ether, benzol, carbon tetrachlorid, ethane tetrachlorid, benzol dichlorid, chloroform, sulfuric ether, dichlorhydrin, epichlorhydrin, carbon sulfid, ethylene trichlorid. It has furthermore been practicable to obtain the dissociation and extraction of the caffein within rotary boilers or within boilers with rotary anodes or rotary cathodes to agitate the wet coffee. Using hot acetic ether as a dissolvent, a nearly complete extraction of the caffein from unground raw coffee takes place with a five volts tension within twelve to eighteen hours, according to the weakness of the coffee beans. After having performed the extraction, the residues of the solvent which adhere to the coffee are evaporated in the usual manner.

As illustrating one form of an apparatus in which the process in accordance with this invention can be carried out reference is had to the accompanying drawing which illustrates the apparatus in longitudinal section.

Referring to the drawings in detail, $a$ denotes a rotary vessel which is provided with a heating jacket $b$ mounted upon rollers $c$. The jacket $b$ is connected conductively by a conduit ring $d$ and a brush $e$ with one electrode while the other electrode is connected by a brush $f$, a contact ring $g$ and a wire $h$, the latter being insulated from the vessel $a$, with a hollow body $k$ arranged within the vessel $a$ and mounted on insulated supports $i$. The vessel $a$ with the jacket $b$ is mounted upon the uprights $n$. Communicating with the interior of the vessel $a$ are a pair of pipes which extend from and communicate with a reservoir $w$.

The pipes are indicated by the reference characters $o$ and $o'$, the pipe $o$ being arranged within the pipe $o'$. The pipe $o'$ communicates with the reservoir $w$ through the port $o^3$ and pocket $o^4$, that is to say, the pipe $o'$ opens into the pocket $o^4$, the latter communicating with the reservoir $w$ through the port $o^3$. The pipe $o$ extends in the pocket $o^4$ and has its upper end arranged directly below the port $o^3$. The reservoir $w$ is inclosed by a pair of coolers, the inner cooler being indicated by the reference character $p$ and the outer cooler by the reference character $q$. Within the outer cooler $q$ is arranged a coil $s$ which at its upper end communicates with the reservoir $w$, said upper end being the inlet of the coil and at its lower end communicates with the reservoir $w$, said lower end being the outlet of the coil. The pipe $o'$ serves to conduct to the reservoir $w$ the heat solvent vapors generated in the vessel $a$. The vapors pass up the pipe $o'$ into the pocket $o^4$ and through the port $o^3$ into the reservoir $w$ where they are condensed, certain of the vapors pass off into the coil $s$ and are condensed and discharged back into the reservoir $w$. The condensed vapors pass down into the pipe $o$ and then are discharged into the vessel $a$. The inner pipe $o$ is, what may be termed, a supply pipe for the extracting solvent and during the passage of the extracting solvent through the pipe $o$ into the vessel $a$, in case the hot vapors are passing through the pipe $o'$ to the cooler, the solvent is moderately heated on its passage to the vessel $a$. The two pipes serve respectively for carrying away the solvent vapors and conducting back the condensed solvent with the greatest possible economy of heat.

The cooling medium supply pipes are indicated by the reference characters $s'$ and $s^2$ and the outlet pipes by the reference characters $s^3$, $s^4$.

The manner of carrying out the process is as follows: 50 kg. of raw unground coffee beans are steeped in an open boiler for twelve hours, with twenty liters of water so that the water penetrates thoroughly into the beans and is evenly absorbed and distributed. The coffee so moistened is then introduced into the vessel $a$ (the manhole used for such purpose is not shown), the apparatus is then revolved and during its revolution the thoroughly moistened beans are subjected to the electric current, in such case the current transverses the moistened coffee from the electrode $k$ to the other electrode, (vessel $a$), the current is furnished by a dynamo machine of ten volts tension. Such operation is carried on for about half an hour and which dissociates the caffein from the tannic acid so that the extraction will be facilitated. After the passage of the current for the period stated acetic ether is supplied to the vessel $a$ through the reservoir and pipe $o$, the amount of the acetic ether being such as to about half fill the vessel $a$, that is, about 50 liters. A heating medium is then supplied to the jacket $b$, so that the acetic ether comes to a boil. The vapors generated in the vessel $a$ are conducted therefrom into the reservoir $w$ through the pipe $o'$ where they are condensed and flow back through the pipe $o$ into the vessel $a$. This operation is carried on for about three hours without the passage of the current. The acetic acid is then drawn off with the extracted caffein (through a draw off cock not shown), and transferred to a distilling apparatus, where the acetic ether is dissolved off so that the caffein remains in a cencentrated aqueous solution. Now in the meanwhile acetic ether is introduced into the vessel $a$ until it is about half full, the acetic either heated again and the extraction carried on for about three hours, in which case, however, the electric current is caused to pass through the beans.

After the period for the foregoing operation, the acetic ether is drawn off, the foregoing process is repeated once or twice as occasion may require. After the last charge of acetic ether has been drawn off all the caffein has then been removed from the coffee beans, except hardly perceptible traces, the beans are then removed from the vessel $a$ and freed in any suitable distilling or drying apparatus from the acetic ether and water that has been absorbed. For this purpose if desired, the vessel $a$ can be employed, if it is employed, it is provided with suitable means for circulating therethrough a heating medium, such as hot air or steam.

When the moistened beans are subjected to the electric current, the caffein and tannic acid combinations are dissociated whereby the extraction of the caffein is facilitated when the beans are again subjected to acetic ether.

The acetic ether used for extraction is freed by distillation from the caffein and used over and over again.

It has been found generally that the moistening of the beans by water is sufficient for the conducting of the current, however, if it be not sufficient, an acid can be added to the water which will then produce sufficient conductivity.

What I claim is:

1. A process of extracting caffein from unground raw coffee comprising the thorough moistening of the coffee, then passing an electrical current through the mass to dissociate the caffein from the tannic acid, then subjecting the coffee to a hot caffein extracting solvent whereby the caffein is removed from the coffee while at the same time leaving undissolved the aromatic and other ingredients of the coffee, and then removing the solvent adhering to the coffee.

2. A process of extracting caffein from unground raw coffee comprising the thorough moistening of the coffee, then passing an electrical current through the mass to dissociate the caffein from the tannic acid, then subjecting the coffee to a hot caffein extracting solvent whereby the caffein is removed from the coffee while at the same time leaving undissolved the aromatic and other ingredients of the coffee, and then removing the solvent adhering to the coffee and maintaining the coffee in a state of agitation during the passage of the current and during the subjecting of the coffee to the solvent.

3. The process of extracting caffein from unground raw coffee comprising moistening the coffee, and then subjecting the coffee to electrolysis and an extracting solvent whereby the caffein is removed from the coffee, and then removing the solvent from the coffee.

In testimony whereof I affix my signature.

HEINRICH TRILLICH.

In the presence of—
Louis Mueller,
Mathilde K. Held.